E. KUNKEL.
WATER MOTOR.
APPLICATION FILED OCT. 21, 1919.
1,381,712. Patented June 14, 1921.
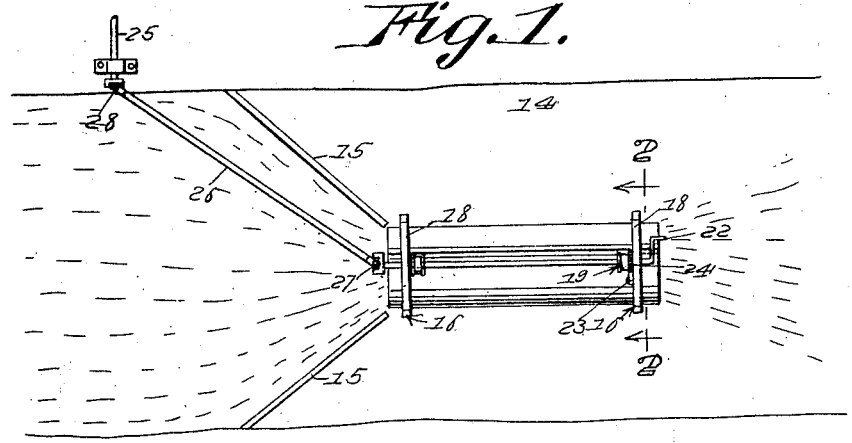
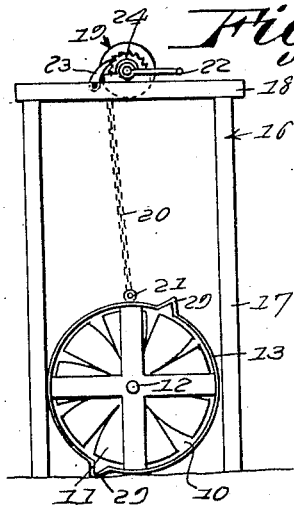
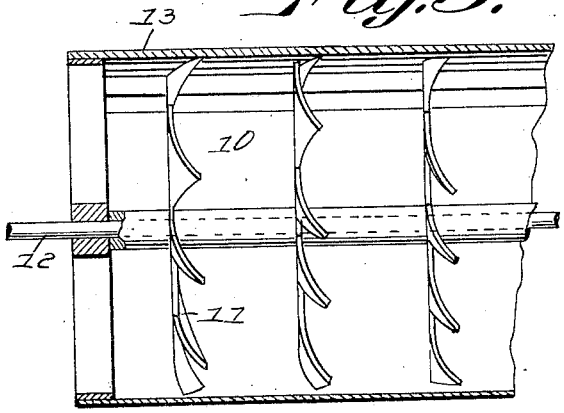
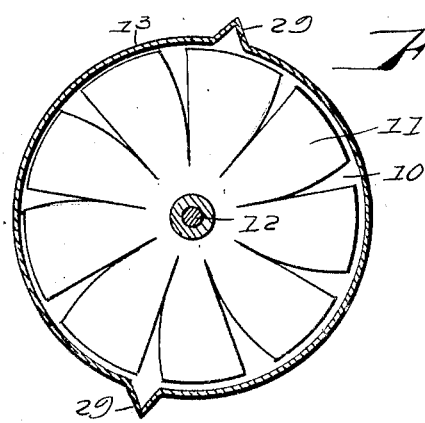

UNITED STATES PATENT OFFICE.

ELI KUNKEL, OF NORTH PLATTE, NEBRASKA.

WATER-MOTOR.

1,381,712.  Specification of Letters Patent.  Patented June 14, 1921.

Application filed October 21, 1919. Serial No. 332,233.

*To all whom it may concern:*

Be it known that ELI KUNKEL, a citizen of the United States of America, residing at North Platte, in the county of Lincoln and State of Nebraska, has invented new and useful Improvements in Water-Motors, of which the following is a specification.

The object of the invention is to provide a simple and relatively inexpensive apparatus for deriving power from flowing water such as that to be found in rivers, streams and smaller water courses, as for example creeks, irrigation ditches and the like, for use more especially for domestic purposes as in operating household lighting plants, for pumping, driving light machinery and the equivalent thereof, and to this end the same consists in a construction and combination of parts of which a preferred embodiment is shown in the accompanying drawing, it being understood that changes in form and proportions, particularly in adapting the device for the desired purpose and to suit the volume of water to be utilized may be resorted to, within the scope of the appended claims without departing from the principles involved.

In the drawings:

Figure 1 is a plan view of the apparatus arranged operatively in a stream.

Fig. 2 is an end view taken from a position indicated by the dotted line 2—2 of Fig. 1.

Fig. 3 is a longitudinal sectional view.

Fig. 4 is a transverse sectional view.

The apparatus consists essentially of one or more rotary units each represented by a wheel 10 having a plurality of radial blades 11 which are disposed divergently from a plane perpendicular to the axis of the wheel which is represented by a shaft 12 preferably common to a plurality of units of which obviously any desired number may be employed in a battery, and all being housed within a cylindrical casing 13 which is adapted to be arranged longitudinally in the stream represented at 14, or with the axis of the series of units parallel with the direction of progress of the water.

When the volume of water in the stream is comparatively limited, and increased power is desired, deflecting elements such as the convergently disposed guide walls 15 may be arranged upstream from the inlet end of the casing to concentrate the water and direct it into the casing, and in order that the rotation of the wheel may be interrupted or discontinued when not required the casing may be mounted in a suitable guide frame 16 having uprights 17 connected by a cross bar 18 upon which may be mounted a windlass 19 having a drum for a hoisting cable or chain 20 connected as by an eye 21 to the casing, said drum having an operating crank 22 and means such as a dog 23 and ratchet 24 being provided to hold the casing with its inclosed battery of rotary units in an elevated position.

Any suitable means may be employed for conveying the rotary motion of the shaft or spindle 12 of the units to a driven shaft 25 or other equivalent means for conveying the power thus generated to a point of consumption for use, such as the connecting shaft 26 having universal joints 27 and 28 connected respectively with the drive shaft 12 and the driven shaft 25.

As there is a tendency, during the passage of the water through the cylinder, and by reason of the movement imparted thereby to the rotary units of the water wheel to receive a gyratory or whirling motion, and as the maximum efficiency of the water in its effect upon the units is derived when the water follows a substantially direct path through the casing in parallelism substantially with the axis of rotation of said units, there is preferably provided a means for controlling or modifying the direction of movement of the water, to overcome said tendency to follow a circulatory path, as by arranging longitudinal channels 29 in or adjacent to the wall of the casing to the end that a portion of the water entering the casing at one end passes directly therethrough to the outlet end, and thus influences to a degree that portion of the water which comes in contact with the blades, it being understood that any desired number of these channels may be employed in this connection as may be found necessary to secure the desired object.

This apparatus as above indicated can be used to advantage particularly in securing the requisite power through a small stream or creek to operate a household lighting plant or domestic pump for operating light farm machinery, but in suitable proportions, obviously, may be used for other purposes requiring greater power, particularly as the number of units which may effectively be used upon a single drive shaft for coöperative action with the same volume of water, is practically unlimited, and the power derived from an apparatus of this type depends upon the pressure rather than upon the rapidity of flow of the water.

What is claimed is:

1. A water motor having rotary units arranged in a battery or series with a common axis arranged in parallelism with the direction of progress of the water and provided with blades deflected respectively from planes perpendicular to said axis, a housing for the units, and means consisting of channels disposed longitudinally of the housing and in substantial parallelism with said axis for directing the water in its passage through the housing.

2. A water motor having a plurality of rotary bladed units carried by a common axial drive shaft disposed in parallelism with the direction of movement of the water and arranged in a water directing housing, and means for communicating motion from said drive shaft to a point of use, the housing being provided with channels disposed in parallelism with the axis of the units for preventing circulatory movement of the water in its passage through the housing.

In testimony whereof he affixes his signature.

ELI KUNKEL.